(No Model.)
C. M. CARNAHAN.
FRAME FOR AGRICULTURAL MACHINERY.
No. 437,392. Patented Sept. 30, 1890.
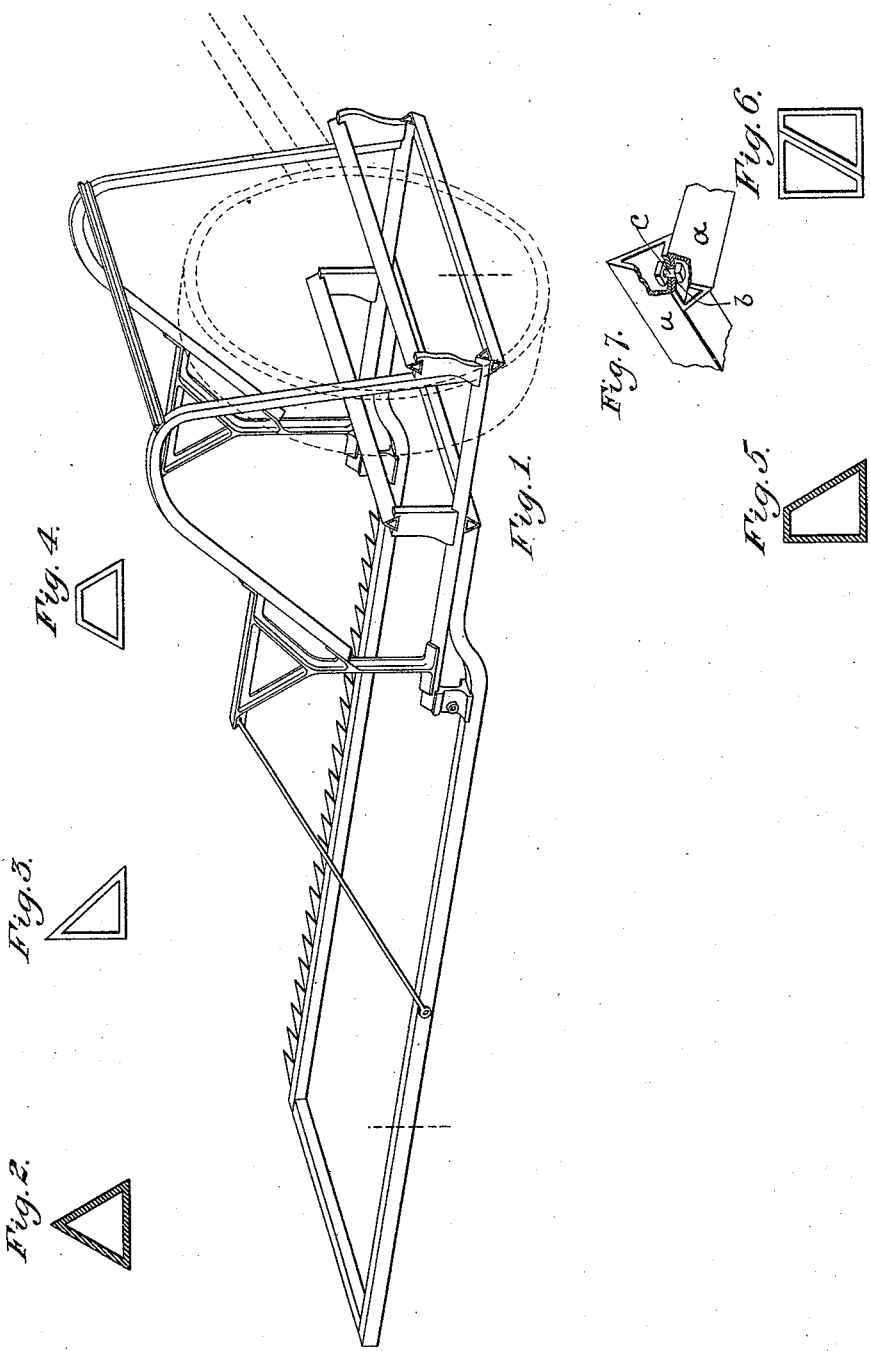
WITNESSES.
H. L. Gill
W. B. Corwin
INVENTOR.
Cyrus M. Carnahan
by W. Bakewell & Sons
his Attorneys

UNITED STATES PATENT OFFICE.

CYRUS M. CARNAHAN, OF CORAOPOLIS, PENNSYLVANIA, ASSIGNOR TO ALPHRETTA CARNAHAN, OF SAME PLACE, AND JOSEPH C. YOUNG, OF ROBINSON, PENNSYLVANIA.

FRAME FOR AGRICULTURAL MACHINERY.

SPECIFICATION forming part of Letters Patent No. 437,392, dated September 30, 1890.

Application filed December 3, 1889. Serial No. 332,401. (No model.)

*To all whom it may concern:*

Be it known that I, CYRUS M. CARNAHAN, a resident of Coraopolis, in the county of Allegheny and State of Pennsylvania, have invented a new and useful Improvement in Frames for Agricultural Machinery, of which the following is a full, clear, and exact description, reference being had to the accompanying drawings, forming part of this specification, in which—

Figure 1 is a perspective view of the frame of a harvesting-machine constructed in accordance with my invention. Figs. 2, 3, 4, 5, and 6 are cross-sectional views of different forms of bars which may be used in the structure of the frame. Fig. 7 is a perspective sectional view showing two bars of the frame bolted together.

My invention consists in constructing the frames of agricultural machinery of wrought-iron or steel bars of a peculiar form, which are adapted to constitute a light, strong, and durable structure well adapted to resist the jarring and rough usage to which machines of this class are subjected. The bars of which the frame is made are of triangular form, or of a form resembling a triangle—that is, either a trapezium or trapezoid. Fig. 2 shows a bar whose cross-section is a triangle substantially equilateral. Fig. 3 shows a bar whose cross-section is a right-angled triangle. Figs. 4 and 5 show bars whose cross-sections are trapezoidal. Fig. 6 shows a compound bar formed by joining together two sectionally-trapezoidal bars. The manner in which these bars are joined together to form the frame and the cutter-bar of the harvesting-machine is clearly shown in Fig. 7. In Fig. 7, which shows the manner of securing two bars together by means of bolts $a\ a$, are the two bars to be joined, having in one side only a bolt-hole $b$, through which passes a short bolt $c$, which firmly clamps the two bars together, leaving the bolts entirely concealed by the remaining sides. This harvesting-machine is shown merely as illustrative of a class of agricultural machines, such as mowers, reapers, and harvesters, the frames of any of which may be constructed in accordance with my invention. Of course if it be desirable the triangular or trapezoidal metal bars may be used in forming a part only of the machine-frame.

I claim—

A frame-work for supporting the operative mechanism of harvesters and like agricultural machines, said frame composed of a series of hollow frame-bars of triangular or trapezoidal form in cross-section, having flat exterior surfaces and adapted to be connected together at the joints by concealed bolts passing through the adjacent sides only of the two bars, substantially as and for the purposes described.

In testimony whereof I have hereunto set my hand this 27th day of November, A. D. 1889.

CYRUS M. CARNAHAN.

Witnesses:
THOMAS W. BAKEWELL,
W. B. CORWIN.